United States Patent
Hobbs

[11] 3,789,697
[45] Feb. 5, 1974

[54] TORQUE CONVERTERS

[76] Inventor: Howard Frederick Hobbs, Rose Cottage Pillory Green, Napton, Rugby, England

[22] Filed: May 8, 1972

[21] Appl. No.: 251,375

[30] Foreign Application Priority Data
May 19, 1971 Great Britain.................. 15812/71

[52] U.S. Cl. .................................................. 74/677
[51] Int. Cl. .......................................... F16h 47/00
[58] Field of Search .................................. 74/677

[56] References Cited
UNITED STATES PATENTS

| | | | |
|---|---|---|---|
| 2,350,810 | 6/1944 | Pentz | 74/677 |
| 2,969,694 | 1/1961 | Harmon et al. | 74/677 |
| 3,073,182 | 1/1963 | Harmon | 74/677 |
| 3,270,586 | 9/1966 | Tuck et al. | 74/677 |
| 3,537,260 | 11/1970 | Hobbs | 74/677 X |

FOREIGN PATENTS OR APPLICATIONS
877,849  9/1961  Great Britain...................... 74/677

*Primary Examiner*—Allan D. Herrmann
*Assistant Examiner*—P. S. Lall
*Attorney, Agent, or Firm*—Alexander & Dowell

[57] ABSTRACT

The invention comprises a torque converter coupling having an input impeller, an output turbine, a power circulatory turbine, a first gearing connecting the circulatory turbine with the impeller and input shaft and the second gearing connecting the first gearing with the output shaft and a stationary part so that the circulatory turbine rotates at a speed less than that of the impeller at low output speeds and greater than that of the impeller at higher output speeds.

6 Claims, 5 Drawing Figures

TORQUE CONVERTERS

This invention relates to hydro-kinetic torque converter-couplings and particularly to the kind of converter-couplings disclosed in our British Pat. No. 1,199,521 comprising an impeller connected to an input shaft, an output turbine connected to an output shaft, a secondary turbine termed a circulatory turbine arranged to be driven by the liquid from the impeller, and a gearing arranged to transmit power from the circulatory turbine to the impeller to provide a circulation of power between the circulatory turbine and the impeller, both the circulatory and output turbines being driven by the liquid momentum imparted by the impeller.

According to the present invention we provide a torque converter-coupling having an impeller connected to an input shaft, an output turbine connected to an output shaft, a circulatory turbine disposed in the flow path, a first gearing, and a second gearing, said first gearing being connected to the circulatory turbine and to the impeller and to the input shaft; said second gearing being connected with the first gearing, the output turbine, the output shaft and a stationary part to enable the second gearing to transmit multiplied torque from said first gearing to the output shaft and to said stationary part for reaction, and said circulatory turbine always to rotate when the impeller rotates and in the same direction and at a speed less than that of the impeller at a lower speed part of the range of speeds of the output shaft and at a speed greater than that of the impeller at a higher speed part of said range.

The circulatory turbine is driven by the liquid momentum imparted by the impeller and transmits power by means of the gearings back to the impeller and to an output shaft when that shaft is in motion.

When the output shaft is stationary, as at stall, the circulatory turbine applies driving torque to the output shaft.

The gearings will include a reaction member which applies reaction torque to a stationary part. The gearings permit the circulatory turbine to rotate at variable speeds in relation to the speed of the impeller and input shaft. At stall the circulatory turbine will rotate at a lower speed than the impeller and at a higher speed as coupling is approached. The circulatory turbine will rotate at the same speed as the impeller and input shaft at some intermediate speed ratio between the input and output shafts.

The gearing may comprise or consist of toothed gearing.

The reaction member may connect a stationary part by means of a detent which can over-run during coupling to permit the liquid from the impeller to flow through the circulatory turbine with little change in momentum and disturbance.

The apparatus will have an impeller and a circulatory turbine but may also include additional elements such as a turbine and a reactor. A reactor is not essential in all forms of the invention.

The blades of the circulatory turbine may be pivoted and the angles may be varied during operation.

The invention will be further described by way of example with reference to the accompanying drawings, wherein.

Figure 1:
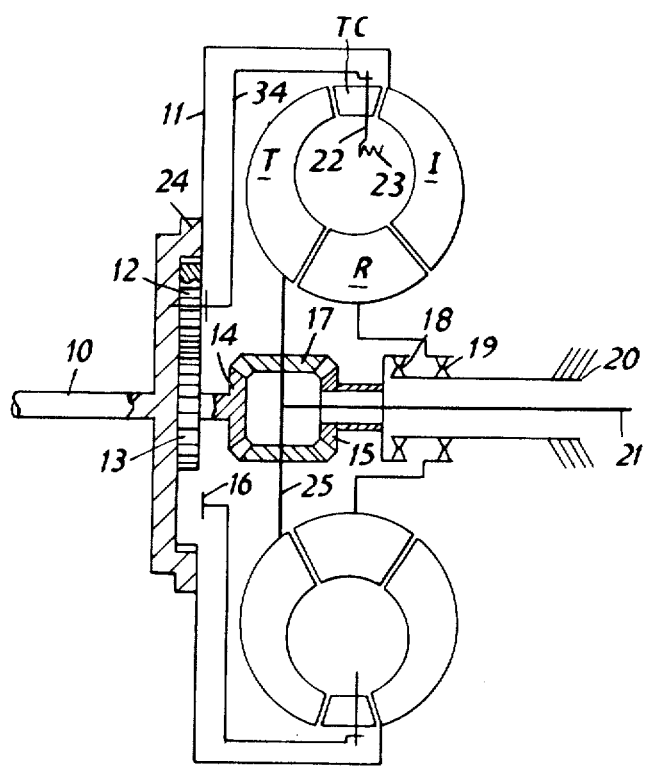
FIG. 1 is a diagrammatic sectional view of a torque converter made in accordance with the invention.

In FIG. 1 there is shown an input shaft 10 and a converter output shaft 21. An impeller I is connected to the input shaft by a rotary housing 11, a circulatory turbine TC is mounted on a plate 34, an output turbine T is connected to the output shaft 21 by means of a gear carrier 25 and a reactor R is arranged to react on a stationary part 20 through a reaction device in the form of a one-way detent 19.

The rotary housing 11 carries a ring gear 24 which meshes with a number of pinions 12 and which in turn mesh with a sun-wheel 13. A carrier 16, in which the pinions 12 are mounted, forms part of the plate 34 which carries the circulatory turbine TC. The parts 12, 13, 16 and 24 comprise a first gearing which is an epicyclic gearing.

The sun-wheel 13 is fixed to a sun-wheel 14 which meshes with pinions 17 which in turn mesh with a sun-wheel 15 which can react on a stationary part 20, through a reaction device in the form of a one-way detent 18. The pinions 17 are mounted in a carrier 25. The parts 14, 15, 17, 25, 18 constitute a second gearing which is a differential gearing.

The carrier 25 is connected to the converter output shaft 21 and also serves to carry the turbine T and connect it to the output shaft.

The blades of the circulatory turbine TC, or some of them, are mounted on spindles 22 and resiliently anchored such as by springs 23. Stops may be provided to limit the variation in angle.

Figure 2:
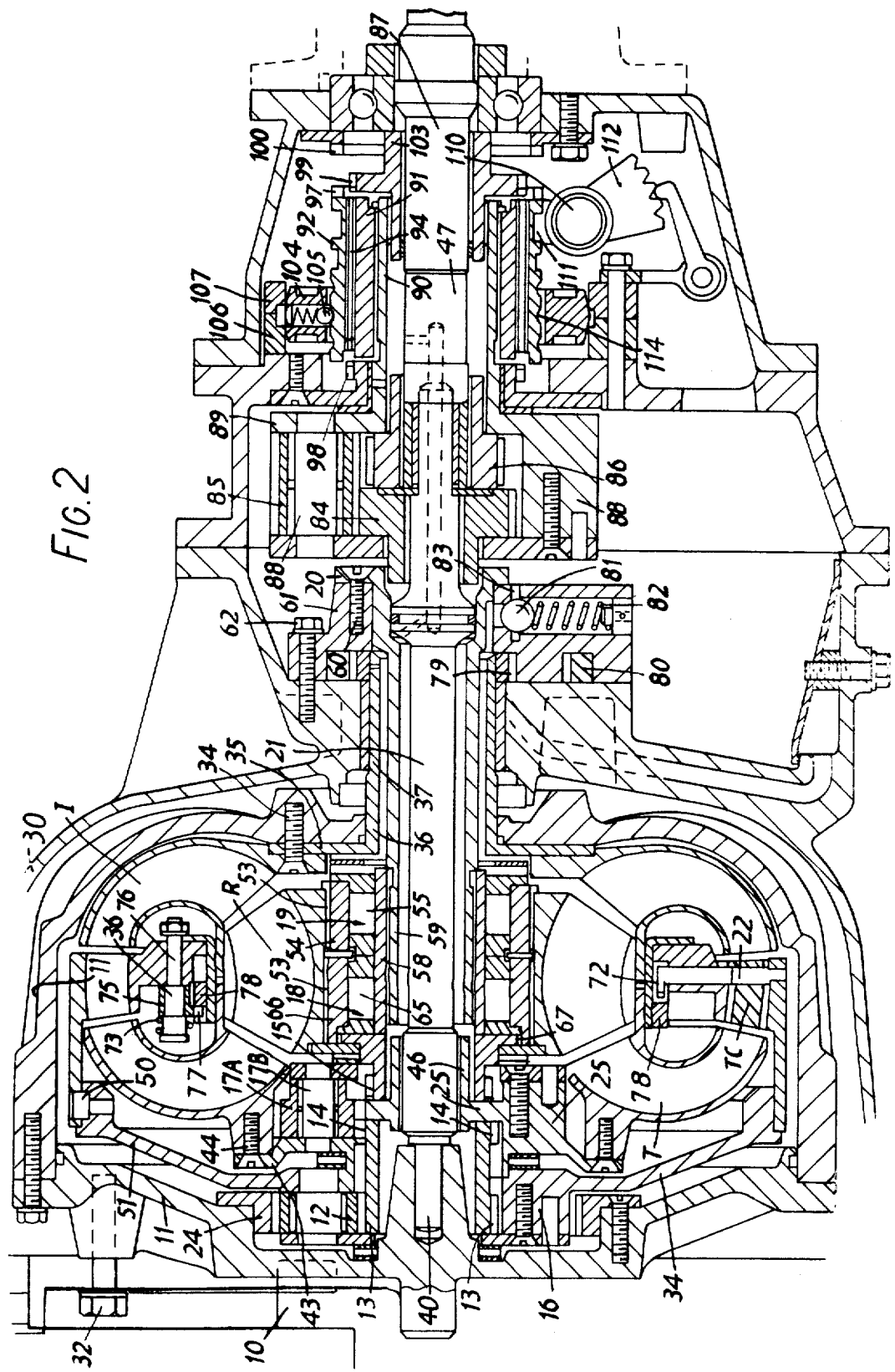
FIG. 2 is a sectional view of the torque converter with reversing gearing for a motor car.
Figure 3:
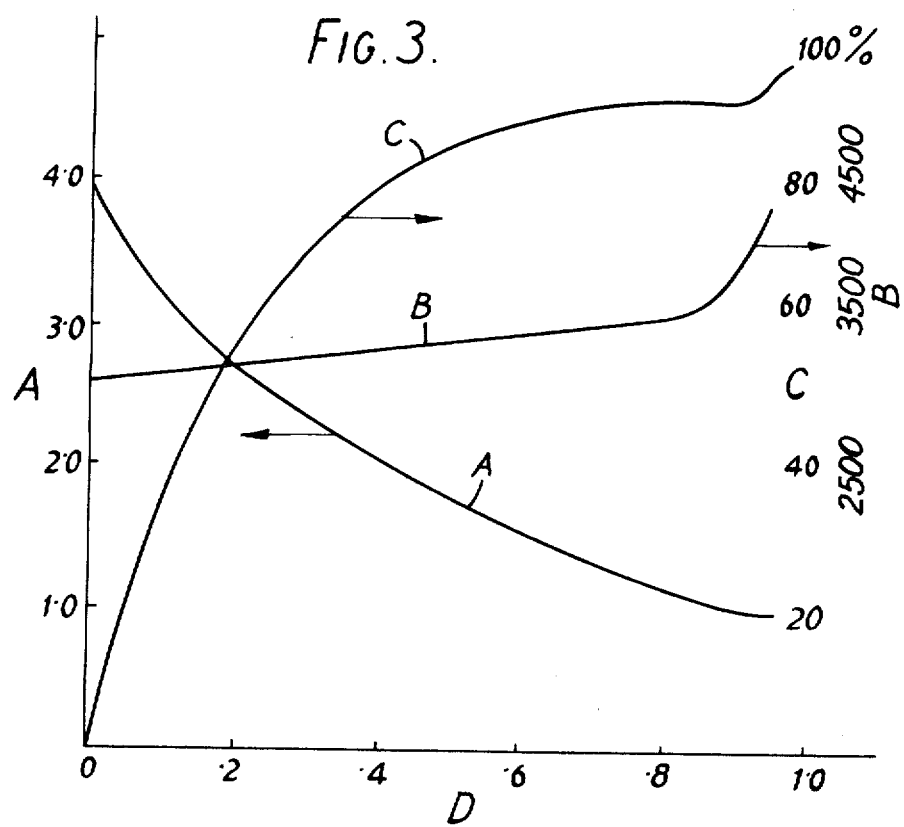
FIG. 3 is a graph showing performance of this torque converter; $A$ = torque ratio, $B$ = input speed, $C$ = efficiency, and $D$ = speed ratio.

In the arrangements shown in FIGS. 1 and 2 similar references relate to the same parts. In FIG. 2 a fixed housing 30 encases the torque converter and carries bearings for the various rotary parts. The input shaft 10 carries a plate 31 which is bolted by bolts 32 to the rotary housing 11. The rear of the housing 11 is fixed by screws 34 to the impeller I and to a flange 35 on a hollow shaft 36 which is carried in a bearing 37 in the fixed housing 30.

The rotary housing 11 provides a bearing for a spigot 40 on the forward end of the output shaft 21. The housing 11 also carries the ring gear 24. The pinions 13, 14 are formed integrally on a member 41 and the pinion 14 meshes with a pinion (not shown) similar to pinion 17 of FIG. 1 and the latter meshes with a pinion 17A, the spindle 17B of which is carried in a plate 43 which is part of member 25 and is fixed by screws 44 to the turbine T. The plate 43, 25 has a sleeve 46 splined on to the output shaft 21.

The circulatory turbine TC is fixed by screws 50 to a plate 51 which carries the spindles of the pinions 12.

The reaction member R is splined at 53 to the outer shell 54 of the reaction detent 19 which has detent members 55 engaging an inner sleeve 58 of the detent which is splined on to a sleeve 59. The sleeve 59 is attached by screws 60 to a plate 61 which in turn is attached by screws 62 to the fixed housing 30.

The detent sleeve 58 also serves for the detent 18 which has detent elements 65 within an outer shell 66 which is fixed by teeth 67 to the pinion 15.

The circulatory turbine TC also carries spindles 76 on which bobweights 75 are mounted and are held in an inwards position by springs 73. Arms 77 forming part of the bobweights engage slots in a ring 78. Spindles 22 also have arms 72 which engage other slots in the ring 78. As the bobweights move out with increasing speed the arms 77 turn the ring which acts on the arms 72 to rotate the spindles 22 to vary the angle of the blades. The angle of the blades may be varied by other means or additional means, for example a piston on which a variable fluid pressure acts.

The element TC may alternatively have fixed blades.

The sleeve 36 drives a pump 79, 80 which has a relief valve 81, spring 82 and exhaust 83 to keep the converter charged at a selected pressure. A reversing gearbox is provided behind the converter comprising a sun-wheel 84 splined on to the converter output shaft 21 and meshing with pinions 85. The pinions 85 mesh with other pinions (not shown) which mesh with a sun-wheel 86 which is splined on to a final output shaft 87.

The pinions 85 are crried on spindles 88 which in turn are carried by a cage 89 on a sleeve 90. Another sleeve 91 surrounds and is fixed to sleeve 90. A toothed sleeve 92 is slidable on sleeve 91 and its splines 94 can engage fixed teeth 98 for reverse, or teeth 99 for forward running, when the sun-wheels and pinions are locked against relative rotation. The sleeve 92 also has teeth 97 which can engage fixed teeth 100 for so called parking lock. The teeth 99 are on a pinion 103 fixed on the final output shaft 87.

A synchronising block 104 is splined to the sleeve 92 and positioned thereon by a spring loaded ball 105 (there may be several) engaging grooves 114 in the sleeve 92. The rings 106, 107 are attached to the housing of the transmission.

There is a shaft 110 carrying a fork 111 to move the sleeve 92 and a detent device 112 to locate the sleeve in reverse, neutral, forward and park. When engaging forward or reverse from neutral, the block 104 is brought into contact with either ring 106 or 107, and owing to the pressure required to move the spring loaded ball or balls 105 from the groove 114 friction between block 104 and either ring 106 or 107 in known manner will cause the cage 89 and sleeve 92 to be brought to rest so that either teeth 98 or 99 can be engaged without noise and shock.

When selected in forward the ball 105 locates the block so as not to engage either ring 106 or 107.

The teeth for parking lock are of suitable shape to assist disengagement. The forward-reverse control may include a switch to cut the ignition of an input engine to facilitate disengagement of teeth 98, 99.

It will be understood that the principle described can be applied to torque converters and torque converter couplings in many different ways and combined with various combinations of elements.

In operation of the apparatus of FIGS. 1 and 2, the shaft 10 drives the impeller I. The liquid leaving the impeller drives the circulatory turbine TC so that the circulatory turbine always rotates when the impeller rotates and in the same direction. The liquid leaving the circulatory turbine drives the output turbine T. The torque developed on TC acts on pinions 12 which produces torque on the ring gear 24 and on the son-wheel 13. Torque on the ring gear 24 acts on the impeller I producing circulation of power and greatly increasing the torque driving the impeller, i.e., by means of the first gearing, thereby increasing its speed and that of the input shaft. Torque on the sun-wheel 13 is transmitted by the second gearing 14, 15, 17 to the output shaft and to the reaction device 18. The second gearing increases the torque acting on the output shaft. The power transmitted by the circulatory turbine can be varied by varying the angle of its blades. The input speeds and torque applied to the output shaft can thus be varied.

If the sun-wheel of the first gearing be made larger in relation to the size of the ring gear less power may be circulated to the impeller and greater torque for a given input power applied to the second gearing and converter output shaft.

If the sun-wheel 14 be made smaller or the sun-wheel 15 larger greater reaction at 18 and increased torque on 21 is obtained.

Figure 4:
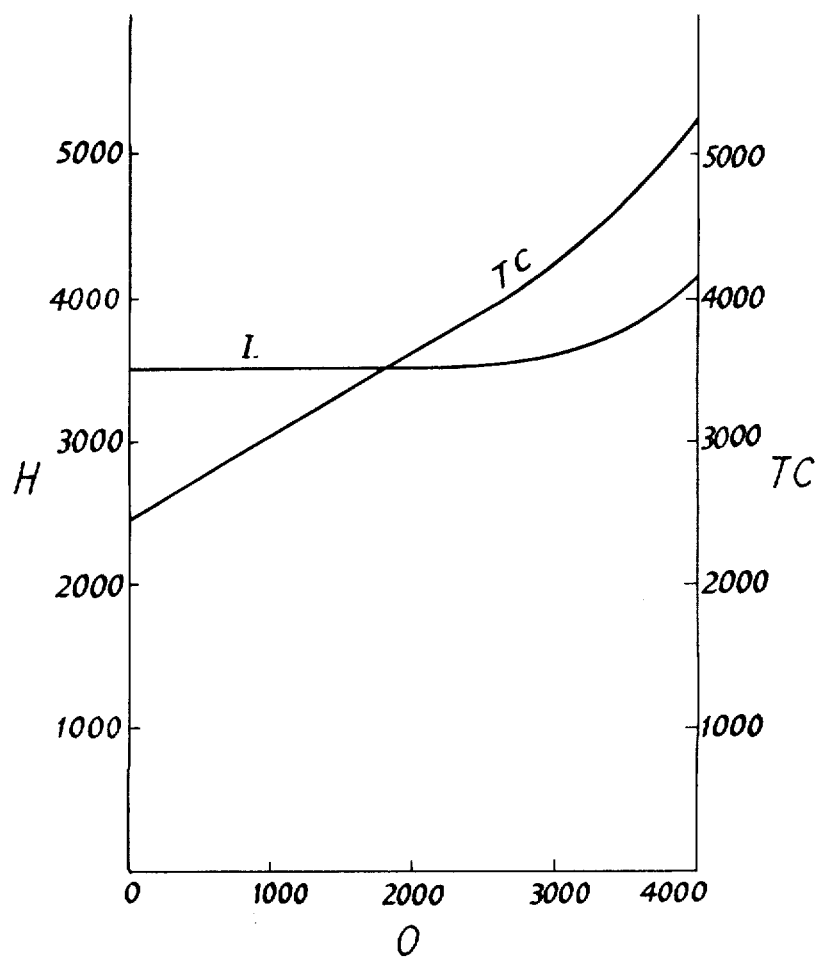
FIG. 4 is a graph showing the variable speeds of the circulatory turbine (at TC) and the impeller (at H) plotted against output speed 0.

It will be seen, however, from FIG. 4 that the first and second gearings allow the circulatory turbine to run slower than the impeller at stall (i.e., when the output shaft is stationary) and at the lower speeds of the output shaft and to run faster than the impeller at coupling and at the higher speeds of the output shaft. It will be understood that the ratios provided by the gearings will determine the speeds at which the circulatory turbine is allowed to run.

In the apparatus of our British Pat. No. 1,199,521 the circulatory turbine always run faster than the impeller and is found to be very effective at the higher output shaft speeds. The present invention provides greater power circulation at stall and at the lower speeds. The torque from the circulatory turbine is dependent on the difference between the tangential velocity of the fluid at entry and at exit. As the circulatory turbine is running slower than the impeller, the difference is greater and the circulatory turbine develops more torque. Part of the torque is also transmitted by the gearings to the output shaft. The maximum torque conversion and low speed efficiencies are thereby substantially increased.

At the higher speeds the circulatory turbine runs faster than the impeller so that at coupling the circulatory turbine can under-run thus becoming ineffective, i.e., the fluid may pass through it without substantial change in velocity. For example, at full power torque conversion may be taking place at close speed ratios between input and output shafts and if the power is reduced the circulatory turbine can under-run allowing coupling to take place.

In FIG. 4 I is impeller speed and TC circulatory turbine speed and it will be observed that the speed differences are never large. Therefore, the circulatory turbine can be effective over a wide range of output shaft speeds. Because of the relatively small speed difference and the reaction obtainable at 18, torque conversion can be obtained at higher speeds and closer speed ratios than from the reactor R. The increased reactions from both 18 and 19 provide increased torques and higher efficiencies than previously obtainable.

As the bobweights 75 rotate with the circulatory turbine, which runs more slowly at stall than at coupling (see FIG. 4) there is considerable variation in centrifugal force and the bobweights may be arranged to allow the blades to open to their greatest angle at stall and progressively move to a finer angle as output speed increases.

This is generally as required to maintain the input speed constant or to increase with increase in output shaft speeds.

The circulatory turbine may have fixed blades, for example when a reactor R is not incorporated. The first and second gearings may be of any suitable type, e.g., belt or friction drives arranged inside or outside the converter. The first and second gearings may comprise friction gears similar to ball races.

Figure 5:
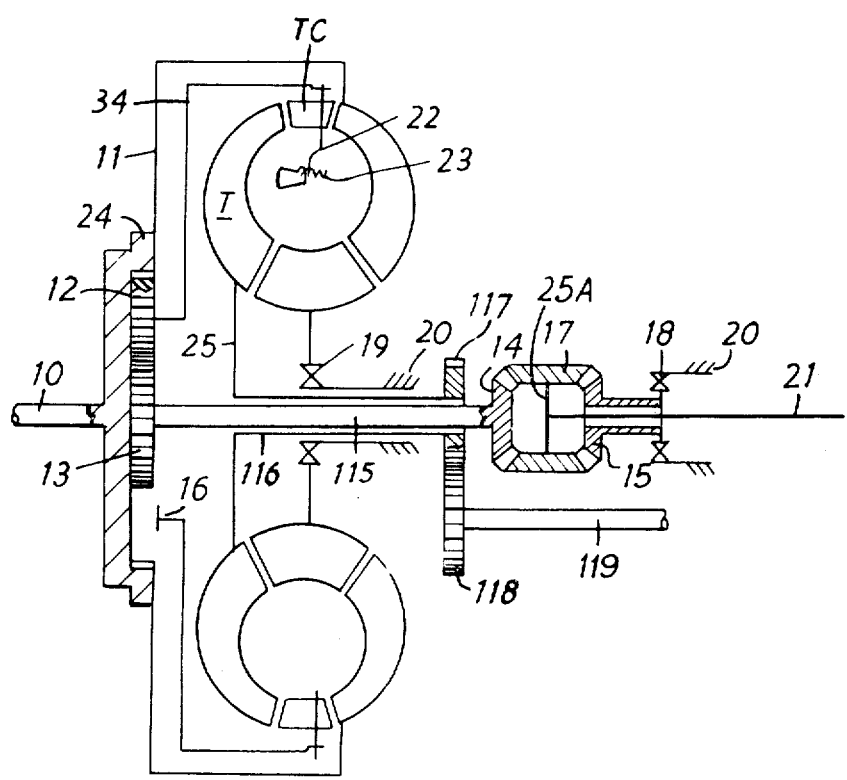
FIG. 5 is a view similar to FIG. 1 but showing a modified construction.

The arrangement shown in FIG. 5 has two output shafts and is suitable for a four wheel drive. In the arrangement shown in FIG. 5, the sun-wheel 13 is mounted on a shaft 115 which carries the second sun-wheel 14. The carrier 25 is mounted on a hollow shaft 116 which surrounds shaft 115 and carries a gearwheel 117 which drives a gearwheel 118 on a second output shaft 119. The pinions 17 are carried by a carrier 25A on the output shaft 21.

At stall, torque on 25 may, for example, be two-thirds of the total and on 25A one-third of the total, according to the ratios of the gearings. At coupling condition all of the output torque will act on 25. At a 2:1 transmission ratio, the torque distribution remains roughly two-thirds and one-third as at stall condition, thereafter more and more of the torque acts on 25 as the transmission ratio decreases, e.g., about three-quarters on 25 and one-quarter on 25A at a transmission ratio of 1.5:1. This kind of torque distribution to front and rear wheels is as generally required. Over-run engine braking will act on 25 only in the arrangement shown.

With the arrangement shown in FIG. 5 if one set of wheels slips reduced torque will act on the other set but the input engine will not race as the transmission ratio is reduced.

Devices as used, e.g., freewheels or clutches and gearing, in known four-wheel drives and acting between shafts 104 and 21 may be employed so that if one set of wheels slips increased torque may be applied to the other set. This is often disadvantageous and in the case of the present invention the increase in torque can be limited as a geared connection between the shafts other than 1:1 may alter the effective ratios of the first and second gearings and thereby the transmission ratio of the device.

I claim:

1. A torque converter coupling having input shaft, an impeller connected to the input shaft, an output shaft, an output turbine connected to the output shaft, a circulatory turbine disposed in the flow path between the impeller and said output turbine, a first gearing and a second gearing, said first gearing connecting the circulatory turbine to the impeller; said second gearing being connected with the first gearing, the output shaft and a stationary part; whereby the first gearing can transmit driving torque from said circulatory turbine to said impeller, and driving torque increased by the second gearing is transmitted from the circulatory turbine through said first gearing to the output shaft, and reaction torque is imparted to said stationary part, so that the said circulatory turbine will always rotate when the impeller rotates and in the same direction but at a speed less than that of the impeller at a lower speed part of the range of speeds of the output shaft and at a speed greater than that of the impeller at a higher speed part of said range.

2. A torque converter as claimed in claim 1, wherein said first gearing is an epicyclic gearing and said second gearing is a planetary gearing.

3. A torque converter as claimed in claim 1, wherein said first gearing comprises a toothed ring gear, a carrier, a sun-wheel and a number of pinions in said carrier, said pinions engaging the ring gear and sunwheel, said second gearing comprising a second carrier, a toothed planetary gearing having two sun-wheels and pinions in said second carrier engaging the sun-wheels, the said first gearing having its ring gear connected with the impeller and input shaft, its pinion carrier connected with the circulatory turbine, and its sun-wheel connected with a sun-wheel of said second gearing, said second carrier being connected with the output shaft and the other sun-wheel of the second gearing to a stationary part.

4. A torque converter as claimed in claim 3 having a one-way detent between said other sun-wheel of the second gearing and said stationary part arranged to engage in a direction opposite to the direction of rotation of said other sun-wheel of the second gearing.

5. A torque converter as claimed in claim 1 wherein said first gearing comprises a toothed ring gear, a carrier, a sun-wheel and a number of pinions in said carrier, said pinions engaging the ring gear and sun-wheel, said second gearing comprising a second carrier, a toothed planetary gearing having two sun-wheels and pinions in said second carrier engaging the sun-wheels, and wherein the second gearing comprises two sets of pinions meshing with each other and meshing respectively with said two sun-wheels.

6. A torque converter as claimed in claim 1 wherein a part of the second gearing is also drivably connected to the output turbine.

* * * * *